(No Model.)
C. F. WELLS.
LEACH SPRINKLER.
No. 492,647. Patented Feb. 28, 1893.
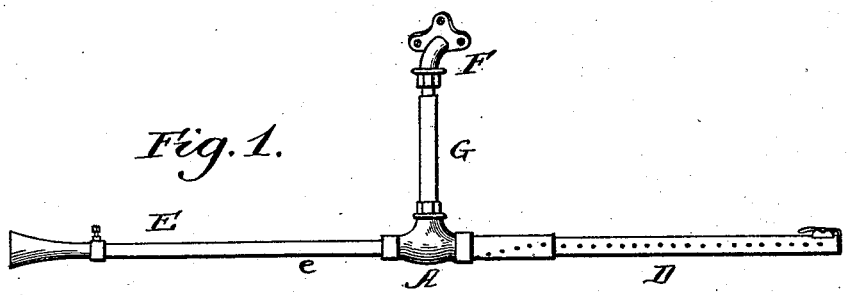
Fig. 1.
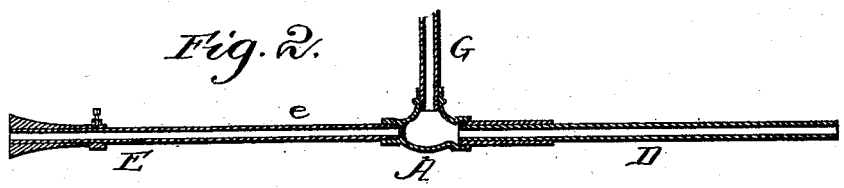
Fig. 2.
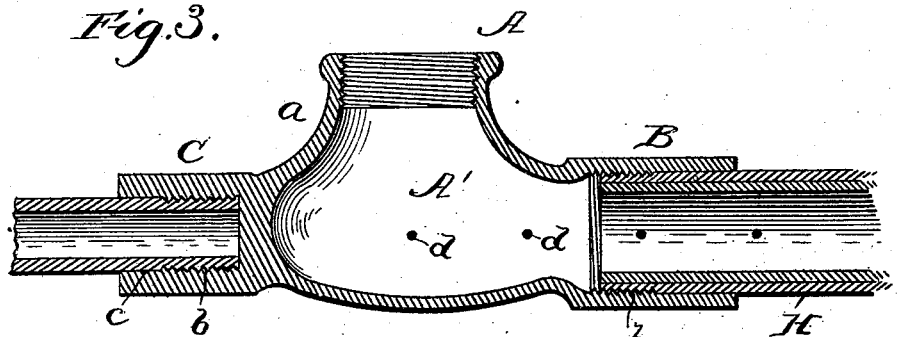
Fig. 3.
Fig. 4.
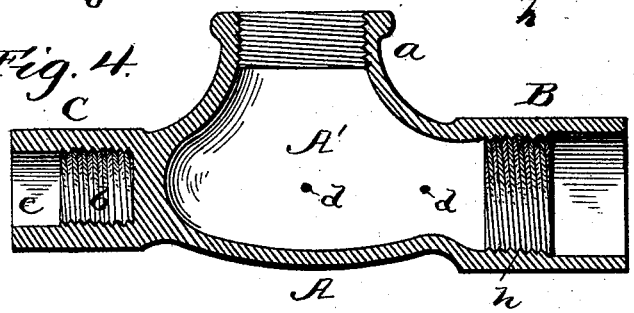
Fig. 5
Witnesses:
J. B. McGirr
H. P. Bernhard
Inventor
Chester F. Wells
By Edson Bros.
Attorneys.

UNITED STATES PATENT OFFICE.

CHESTER F. WELLS, OF BINGHAMTON, NEW YORK.

LEACH-SPRINKLER.

SPECIFICATION forming part of Letters Patent No. 492,647, dated February 28, 1893.

Application filed May 11, 1892. Serial No. 432,643. (No model.)

*To all whom it may concern:*

Be it known that I, CHESTER F. WELLS, a citizen of the United States, residing at Binghamton, in the county of Broome and State of New York, have invented certain new and useful Improvements in Leach-Sprinklers; and I do hereby declare the following to be a full, clear, and exact description of the invention, such as will enable others skilled in the art to which it appertains to make and use the same.

The object of my invention is to overcome breakage of the joint between the radially-perforated distributing pipe of a leach sprinkler used for sprinkling liquid over ground bark in the manufacture of leather, which joint in the ordinary device is weak owing to the thinness of the material employed and to the weight of the liquid when the pipe is filled; and a further object is to strengthen and reinforce the distributing pipe.

With these ends in view, the first part of my invention consists in a hub or T-connection having each of its horizontal limbs or branches screw threaded internally and counterbored for a portion of its length, combined with a counterpoise with its shank screwed into one arm of the hub or T-connection, and a radially perforated distributing pipe provided with an external reinforcing sleeve which is fitted tightly in one counterbored end of the hub or T-connection, the extreme inner end of said reinforcing band being screw threaded and screwed into the inner threaded part of the hub beyond or within the counterbored part of the hub, said counterbore forming a bearing for the distributing pipe and its reinforcing band or sleeve.

The invention further consists in the combination and construction of parts which will be hereinafter described and claimed.

In the accompanying drawings—Figure 1 is a perspective view of a sprinkler embodying my invention. Fig. 2 is a longitudinal sectional view thereof. Fig. 3 is an enlarged sectional view through the hub with the pipe screwed therein. Figs. 4 and 5 are detail views on the hub or T-connection and the distributing pipe.

Like letters of reference denote corresponding parts in all the figures, referring to which—

A designates my improved hub or T-connection, D is the horizontal distributing pipe, E is the counterpoise, F is the fixed bracket, and G the pipe suspended from said fixed bracket and connected to the vertical branch or limb $a$ of the hub A by any suitable joint or coupling.

The novelty in my invention resides in the construction of the hub A, the manner of stiffening the distributing pipe D and the joints between the hub and the pipe D and counterpoise E; hence, all the other parts of the sprinkler are similar in construction to the ordinary sprinklers used for distributing liquid over ground bark in the manufacture of leather. The hub is made or cast in a single piece with the two horizontal limbs B, C, and the vertical limb $a$, the latter being at right angles to the other limbs B, C, and the lower side of the hub being closed, as usual. The limb or end B of the hub is adapted to receive the distributing pipe D, and the other limb C to receive the shank of the counterpoise; and in practice I prefer to make the limb C of the hub of less diameter than that of the limb A, but the counterpoise is so arranged that its axis and the axis of the pipe D are in line to secure the best results. The limb C however, does not communicate with the central chamber A' of the hub, and the shank of the counterpoise screws into a solid part of the hub. On the other hand, the limb or arm B of the hub has direct connection with the chamber A' of the hub, and the distributing pipe is secured in said arm B so as to receive directly from the chamber of the hub.

The horizontal limbs B, C, of the hub are peculiarly formed to received the pipe and the counterpoise, respectively, that is to say, the inner end or part of each limb is internally screw threaded, at $b$, and the outer part of the limb is made plain and cylindrical, at $c$, by counterboring said outer end of the limb, thus providing bearings therein for the pipe or the counterpoise. Said counterpoise has its shank, $e$, made of such diameter that it fits snugly in the counterbored part or bearing $c$ of the limb, C, and the inner extremity of said shank is screw-threaded as shown in Figs. 2 and 3, said inner threaded end of the counterpoise being screwed into the threaded inner part of the limb C and the plain part of said shank in said limb bears firmly on the counterbored smooth bearing c, thus forming a very secure and strong connection for the shank of the counterpoise to the hub.

The distributing pipe D is, as usual, provided along its length with the series of radial perforations d; and to the inner part of said distributing pipe is secured a reinforcing sleeve H which serves to stiffen and strengthen the distributing pipe at the points where it is secured or fitted in the limb B of the hub or T-connection.

The inner part of the reinforcing sleeve H is externally screw-threaded, as at h, and the external diameter of said sleeve adjacent to the threaded part of said sleeve corresponds to the counterbored bearing c of the limb B of the hub; and when the sleeve H and pipe D are fitted in the hub limb B, the screw threaded part h of the sleeve is screwed into the threaded inner end b of the limb B and the end of the sleeve adjacent to the threaded part thereof bears firmly against the counterbored bearing c of the limb B, thus forming the secure strong joint between the hub and the distributing pipe.

I attach importance especially to the peculiar joint for securing the distributing pipe to the hub as I am thus enabled to overcome damage and injury to the pipe at its weakest point when the same is filled with liquid to be distributed; also, to the reinforcing sleeve which additionally stiffens and strengthens the distributing pipe, and to the joint between the shank of the counterpoise and the hub.

The operation and advantages of my invention will be readily understood and appreciated by those skilled in the art from the foregoing description taken in connection with the drawings.

I am aware that changes in the form and proportion of parts and details of construction of the devices herein shown and described as an embodiment of my invention may be made without departing from the spirit or sacrificing the advantages thereof, and I therefore reserve the right to make such changes as fairly fall within the scope of my invention.

Having thus fully described my invention, what I claim as new, and desire to secure by Letters Patent, is—

In a suspended leach sprinkler, the combination with a fixed bracket, and a depending tube fastened to said bracket, of the hub having its vertical arm or limb fastened to said depending tube and provided with the horizontal arm which is internally screwthreaded at its inner end and plain or smooth beyond said threaded portion, a perforated reinforcement sleeve having its inner threaded end screwed into the threaded part of the horizontal arm and bearing against the interior smooth or plain part thereof, a perforated distributing pipe fixed at its inner end in said reinforcement sleeve and communicating with the chamber of the hub, and a counterbalanced arm fastened to said hub opposite to the distributing pipe, as and for the purpose described.

In testimony whereof I affix my signature in presence of two witnesses.

CHESTER F. WELLS.

Witnesses:
H. C. REGUS,
R. B. RICHARDS.